United States Patent [19]

Chino

[11] Patent Number: 5,761,637
[45] Date of Patent: Jun. 2, 1998

[54] DIALOGUE-SOUND PROCESSING APPARATUS AND METHOD

[75] Inventor: Tetsuro Chino, Osaka-fu, Japan

[73] Assignee: Kabushiki Kaisha Toshiba, Kawasaki, Japan

[21] Appl. No.: 510,277

[22] Filed: Aug. 2, 1995

[30] Foreign Application Priority Data

Aug. 9, 1994 [JP] Japan .................................. 6-187440
Jul. 18, 1995 [JP] Japan .................................. 7-181456

[51] Int. Cl.$^6$ .................................................. G10L 9/00
[52] U.S. Cl. ........................... 704/231; 704/251; 704/275
[58] Field of Search .............................. 395/2.4–2.66, 395/2.79, 2.84

[56] References Cited

PUBLICATIONS

Y. Takebayashi et al., "A Robust Speech Recognition System Using Word–Spotting With Noise Immunity Learning", Proceedings of the ICASSP 91, pp. 905–908 (1991).

K. De Smedt, "IPF: An Incremental Parallel Formulator", Current Research in Natural Language Generation, Kluwer Academic Pub., pp. 167–192 (1990).

*Primary Examiner*—Allen R. MacDonald
*Assistant Examiner*—Susan Wieland
*Attorney, Agent, or Firm*—Finnegan, Henderson, Farabow, Garrett & Dunner, L.L.P.

[57] ABSTRACT

A dialogue-sound processing appratus of the present invention generates discourse structure representing the flow of dialogue from fragmentary spoken utterances. In the dialogue-sound processing apparatus, the speech fragments of the dialogue-sound is inputted through a sound input section. A clue extraction section extracts clue which is a word or prosodic feature representing flow of dialogue from the speech fragments. An utterance function rule memory section memorizes utterance function rule which is correspondence relation between the clue and the utterance function representing pragmatic effect for the flow of dialogue. An utterance function extraction section assigns the utterance function to the clue in accordance with the utterance function rule. A discourse structure generation section generates discourse structure representing the flow of dialogue from fragmentary spoken utterances in accordance with the utterance function corresponding to the clue assigned by the utterance function extraction section.

11 Claims, 15 Drawing Sheets

| STORE ADDRESS INFORMATION | UTTERANCE ID INFORMATION | SPEAKER SIGN INFORMATION | UTTERANCE BEGINNING POINT INFORMATION | UTTERANCE END POINT INFORMATION | DIALOGUE SOUND INFORMATION |
|---|---|---|---|---|---|
| P11 | U1 | A | 0.0 | 2.2 | (HI!, MAY I ASK YOU SOMETHING?) |
| P12 | U2 | B | 2.1 | 2.4 | (YES↑) |
| P13 | U3 | A | 2.5 | 3.9 | (YOU KNOW~?) |
| P14 | U4 | B | 3.8 | 3.9 | (UH-HUH) |
| P15 | U5 | A | 4.0 | 5.2 | (WHAT IS~↑) |
| P16 | U6 | B | 5.3 | 6.2 | (UHM, THAT'S~) |
| P17 | U7 | A | 6.3 | 6.5 | (YES?) |
| P18 | U8 | B | 6.8 | 8.2 | (THAT'S~) |
| P19 | U9 | A | 8.1 | 8.2 | (WHAT?↑) |
| P20 | U10 | A | 8.4 | 9.7 | (YOU SAID~?) |
| P21 | U11 | B | 10.2 | 12.5 | (YES~) |
| P22 | U12 | A | 12.9 | 13.2 | (REALLY?↓) |
| P23 | U13 | B | 13.6 | 15.0 | (AND,~) |
| P24 | U14 | A | 15.2 | 16.7 | (THAT SO?↓) |
| ... | ... | ... | ... | ... | ... |

FIG. 2

| CLASSIFICATION | | | CONCRETE EXAMPLE |
|---|---|---|---|
| CLUE | LUINGUISTIC CLUE | COMMUNICATION SUPPORT | YES? IS THAT SO? YAH, YEAH, UH-HUH, REALLY? |
| | | INTERJECTION | UHM, HM OH, WOW AH |
| | | CONNECTION | AND, BUT AND THEN THEN HE GOES~ THOUGH~ SO |
| | | EXTRA PHRASE | X [IS] Y, [ISN'T IT?] RIGHT? GOT IT? SEE? |
| | | TRANSITION TERM | ~THOUGH, |
| | | CALLING | HI, HOWDY, SO LONG BYE, SEE YA, |
| | | EXPRESSION OF SENTENCE - END | ↓ ↑ |
| | | RESTATEMENT | THIS ~ THESE~ |
| | | STAMMER | THIS, THIS IS ~ THAT, THAT IS ~ |
| | | ⋮ | ⋮ |
| | PROSODIC CLUE | POSE | (P) |
| | | INTONATION | (↑), (↓), (↑↓) |
| | | ⋮ | ⋮ |

FIG. 3

| CLUE ID INFORMATION | SOUND CHARACTERISTICS OF CLUE INFORMATION |
|---|---|
| R1 | YES (↓) |
| R2 | YES (↓) |
| R3 | YES (↓) |
| R4 | YES (↑) |
| R5 | YES (↑) |
| R6 | HI! |
| R7 | MAY I ASK YOU SOMETHING? |
| R8 | YOU KNOW ~ ? |
| R9 | UH-HUH |
| R10 | WHAT IS ~ ? |
| R11 | UHM |
| R12 | THAT'S ~ |
| R13 | WHAT? |
| R14 | AND, ~ |
| R15 | THAT'S SO? |
| ⋮ | ⋮ |

FIG. 4

| CLASSIFICATION | FUNCTION NAME | EXPLANATION |
|---|---|---|
| SUBSTANTIAL FUNCTION | PRESENTATION OF TRUTH VALUE | PRESENTATION OF TRUTH VALUE OF PROPOSITION OF UTTERANCE |
| | REQUEST FOR TRUTH VALUE | ASK FOR TRUTH VALUE OF PROPOSITION OF UTTERANCE |
| | PRESENTATION OF STATES OR EVENTS | PRESENTATION OF PROPOSITION OF-UTTERANCE |
| | REQUEST FOR DESCRIPTION OF STATES OR EVENTS | ASK FOR PROPOSITION OF UTTERANCE |
| | REQUEST FOR SOLO ACTION | REQUEST FOR ACTION OF LISTENER |
| | PRESENTATION OF AGREEMENT | PRESENTATION OF AGREEMENT OF REQEST OF LISTENER |
| | REQUEST FOR AGREEMENT | UTTERANCE OF REQUEST FOR AGRREEMENT TO LISTENER |
| | REQUEST FOR GREETING | REQUEST FOR REPLY OF GREETING |
| | PRESENTATION OF ACCEPTANCE | PRESENTATION OF GENERAL ACCEPTANCE FOR REQUEST TO SPEAKER |
| | PRESENTATION OF DENY | PRESENTATION OF GENERAL DENY FOR REQUEST TO SPEAKER |
| | PRESENTATION OF RESERVATION : | PRESENTATION OF RESERVATION OF ATTITUDE FOR REQUEST TO SPEAKER |
| CONTROL FUNCTION | REQUEST FOR ATTENTION | UTTERANCE TO ATTRACT LISTENER'S ATTENTION |
| | PRESENTATION OF ATTENTION | PRESENTATION THAT SPEAKER PAYS ATTENTION TO LISTENER |
| | REQUEST FOR CONFIRMATION | REQUEST FOR CONFIRMATION OF UTTERANCE FROM SPEAKER TO LISTENER |
| | PRESENTATION OF INITIATION FOR EXCHANGE | UTTERANCE OF INITIATE IN STRUCTURE OF EXCHANGE |
| | PRESENTATION OF RESPONSE FOR EXCHANGE | UTTERANCE OF RESPONSE IN STRUCTURE OF EXCHANGE |
| | PRESENTATION OF FEEDBACK FOR EXCHANGE | UTTERANCE OF FEEDBACK IN STRUCTURE OF EXCHANGE |
| | PRESENTATION OF DISMISS FOR EXCHANGE | UTTERANCE TO DISMISS STRUCTURE OF EXCHANGE |
| | REQUEST FOR OPENING OF SESSION | UTTERANCE OF REQUEST FOR OPENING OF SESSION |
| | PRESENTATION OF OPENING OF SESSION | UTTERANCE OF PRESENTATION FOR OPENING OF SESSION |
| | REQUEST FOR AQUISITION OF INITIATIVE | UTTERANCE OF REQUEST FOR INITIATIVE OF DIALOGUE |
| | PRESENTATION OF MAINTENANCE OF INITIATIVE | UTTERANCE OF PRESENTATION OF MAINTENANCE OF INITIATIVE |
| | PRESENTATION OF TRANSFER OF INITIATIVE : | UTTERANCE OF PRESENTATION OF TRANSFER OF INITIATIVE : |

FIG. 5

| STORE ADDRESS INFORMATION | CLUE ID INFORMATION | UTTERANCE FUNCTION INFORMATION |
|---|---|---|
| Q01 | R1 | PRESENTATION OF TRUTH VALUE |
| Q02 | R1 | PRESENTATION OF AGREEMENT |
| Q03 | R1 | PRESENTATION OF GREETING |
| Q04 | R1 | PRESENTATION OF ACCEPTANCE |
| Q05 | R2 | PRESENTATION OF RESERVATION |
| Q06 | R3 | PRESENTATION OF SUCCESS OF COMMUNICATION |
| Q07 | R4 | PRESENTATION OF SUSPICION |
| Q08 | R5 | PRESENTATION OF FAILURE OF COMMUNICATION |
| ⋮ | ⋮ | ⋮ |
| Q11 | R6 | REQUEST FOR AQUISTION OF INITIATIVE, REQUEST FOR ATTENTION, REQUEST FOR OPENING OF SESSION |
| ⋮ | ⋮ | |
| Q21 | R7 | PRESENTATION OF MAINTENANCE OF INITIATIVE |
| ⋮ | ⋮ | |
| Q31 | R8 | PRESENTATION OF MAINTENANCE OF INITIATIVE |
| ⋮ | ⋮ | |
| Q41 | R9 | PRESENTATION OF SUCCESS OF COMMUNICATION |
| ⋮ | ⋮ | |
| Q51 | R10 | REQUEST FOR TRUTH VALUE PRESENTATION OF TRANSFER OF INITIATIVE, PRESENTATION OF INITIATION OF EXCHANGE |
| ⋮ | ⋮ | |
| Q61 | R11 | REQUEST FOR AQUISITION OF INITIATIVE |
| ⋮ | ⋮ | |
| Q71 | R12 | PRESENTIATON OF MAINTENANCE OF INITIATIVE |
| ⋮ | ⋮ | |
| Q81 | R13 | PRESENTATION OF FAILURE OF COMMUNICATION |
| ⋮ | ⋮ | |
| Q91 | R14 | REQUEST FOR AQUISITION OF INITIATIVE, PRESENTATION OF CLOSING OF SUBDIALOGUE |
| ⋮ | ⋮ | |
| Q91 | R15 | PRESENTATION OF FEEDBACK FOR EXCHANGE |
| ⋮ | ⋮ | ⋮ |

*FIG. 6*

| UTTERANCE ID | SPEAKER | UTTERANCE |
|---|---|---|
| V1 | A | WHEN ARE YOU GOING? |
| V2 | B | LET ME SEE. YOU SEE THIS MEETING WILL BE HELD IN TOKYO. |
| V3 | A | UH-HUH. |
| V4 | B | TOMMOROW \|....I'VE GOT ANOTHER MEETING IN OSAKA. |
| V5 | A | \|I SEE, YOU'RE LEAVING TOMMOROW (....) |
| (V4) | B | SO I'M LEAVING FRIDAY.\| |
| V6 | A | \|OH |
| V7 | A | YOU MEAN YOU'RE LEAVING FRIDAY. |

*FIG. 8*

| STORE ADDRESS | RULE ID | ROOT CATEGORY | ROOT CONDITION | FOOT CATEGORY | FOOT CONDITION | OCCURRENCE CONDITION |
|---|---|---|---|---|---|---|
| S11 | T1 | UT | — | SF | SUBSTANTIAL FUNCTION ≠ ∅ | 1 |
| S12 | T2 | CS | — | SF | SUBSTANTIAL FUNCTION = ∅ | 1 |
| S21 | T3 | CU | INITIATIVE=X | UT | SPEAKER=X | 1+ |
| S22 | T4 | CU | INITIATIVE=X | CS | SPEAKER≠X | 0+ |
| S31 | T5 | TI | INITIATIVE=X | CU | INITIATIVE=X | 1+ |
| S32 | T6 | TR | INITIATIVE=X | CU | INITIATIVE=X | 1+ |
| S33 | T7 | TR | — | EB | EMBEDED=T | (0+) |
| S34 | T8 | TF | — | CU | INITIATIVE=X | 1+ |
| S41 | T9 | EX | INITIATIVE=X | TI | INITIATIVE=X | 1 |
| S42 | T10 | EX | INITIATIVE=X | TR | INITIATIVE=X | 1 |
| S43 | T11 | EX | INITIATIVE=X | CF | INITIATIVE=X | (0+) |
| S44 | T12 | EX | INITIATIVE=X | TF | INITIATIVE=X | 1 (0) |
| S51 | T13 | DS | INITIATIVE=X | EX | INITIATIVE=X | 1+ |
| S61 | T13 | DIAL | INITIATIVE=X | DS | INITIATIVE=X | 1+ |
| S71 | T13 | EB | — | EX | INITIATIVE=X | 1+ |

| STORE ADDRESS | NODE ID | CONSTRAINT LIST | PARENT NODE ID |
|---|---|---|---|
| W11 | SF1 | {REQUEST FOR ACQUISITION OF INITIATIVE, REQUEST FOR ATTENTION, REQUEST FOR OPENING OF SESSION, PRESENTATION OF STATES OR EVENTS~} | |
| W12 | UT1 | ~ | UT1 |
| W21 | SF2 | {PRESENTATION OF ATTENTION, SPEAKER = B} | CU1 |
| W22 | CS2 | ~ | CS2 |
| W41 | CU1 | {INITIATIVE = A} | CU1 |
| W42 | CU2 | ~ | TI1 |
| W51 | SF3 | {PRESENTATION OF STATES OR EVENTS, PRESENTATION OF MAINTENANCE OF INITIATIVE} | ? |
| W52 | UT3 | ~ | UT3 |
| W61 | SF4 | {PRESENTATION OF SUCCESS OF COMMUNICATION} | CU3 |
| W62 | CS4 | ~ | CS4 |
| W71 | CU2 | {INITIATIVE = A} | CU3 |
| W81 | SF5 | {REQUEST FOR TRUTH VALUE, PRESENTATION OF TRANSFER OF INITIATIVE~} | TI1 |
| W81 | UT5 | {INITIATIVE = A} | UT5 |
| W91 | CU5 | {INITIATIVE = A} | CU5 |
| | | | TI1 |

|       | UTTERANCE ID | SPEAKER | CONTENT OF UTTERANCE |
|-------|--------------|---------|----------------------|
| (A)   | U 1          | A       | HI!, MAY I ASK YOU SOMETHING? |
|       | U 2          | B       | YES ↑ |
|       | U 3          | A       | YOU KNOW ~ ? |
|       | U 4          | B       | UH-HUH |
|       | U 5          | A       | WHAT IS ~ ↑ |
|       | U 6          | B       | UHM, THAT'S ~ |
|       | U 7          | A       | YES? |
|       | U 8          | B       | THAT'S ~ |
|       | U 9          | A       | WHAT? ↑ |
|       | U 10         | A       | YOU SAID ~ ? |
|       | U 11         | B       | YES ~ |
|       | U 12         | A       | REALLY? ↓ |
|       | U 13         | B       | AND, ~ |
|       | U 14         | A       | THAT SO ? ↓ |
| (B)   | U 1          | A       | HI!, MAY I ASK YOU SOMETHING? |
|       | U 3          | A       | YOU KNOW ~ ? |
|       | U 5          | A       | WHAT IS ~ ↑ |
|       | U 6          | B       | UHM, THAT'S ~ |
|       | U 8          | B       | THAT'S ~ |
|       | U 10         | A       | YOU SAID ~ ? |
|       | U 11         | B       | YES ~ |
|       | U 12         | A       | REALLY? ↓ |
|       | U 13         | B       | AND, ~ |
|       | U 14         | A       | THAT SO ? ↓ |
| (C)   | U 1          | A       | HI!, MAY I ASK YOU SOMETHING? |
|       | U 2          | B       | YES ↑ |
|       | U 3          | A       | YOU KNOW ~ ? |
|       | U 4          | B       | UH-HUH |
|       | U 5          | A       | WHAT IS ~ ↑ |
|       | U 6          | B       | UHM, THAT'S ~ |
|       | U 7          | A       | YES ? |
|       | U 8          | B       | THAT'S ~ |
|       | U 13         | B       | AND, ~ |
|       | U 14         | A       | THAT SO? ↓ |
| (D)   | U 1          | A       | HI!, MAY I ASK YOU SOMETHING? |
|       | U 3          | A       | YOU KNOW ~ ? |
|       | U 5          | A       | WHAT IS ~ ↑ |
|       | U 6          | B       | UHM, THAT'S ~ |
|       | U 8          | B       | THAT'S ~ |
|       | U 13         | B       | AND, ~ |
|       | U 14         | A       | THAT SO? ↓ |

FIG. 14

DIALOGUE-SOUND PROCESSING APPARATUS AND METHOD

BACKGROUND OF THE INVENTION

1. Field of the Invention

The present invention relates to a dialogue-sound processing apparatus and method for generating a discourse structure representing the flow of the dialogue from fragmental speech of participants.

2. Description of the Related Art

Recently, technology of sound-processing and natural language-analysis has been developed and there are requests for use of various kinds of service in computer by using a user's input sound. As element-technology, sound-recognition processing for converting the user's sound-signal to language information and natural language processing for converting the language information to semantic expression representing the user's intention are necessary.

Sound processing and natural language processing in the prior art are executed by unit of one sentence (utterance). However, in order to process dialogue-sound with a computer, it is necessary to process context information, i.e., a topic of dialogue which is related to the discourse structure of attention, and domain plans of each participant of the dialogue which is related to the discourse structure of intention, and so on. For example, when the computer automatically determines one candidate from plural candidates of recognition result, context information, i.e., topic, is necessary. When the computer automatically analyses the input sound as natural language, the computer can not analyse each utterance independently because it often happens that a word of the topic is omitted or a demonstrative pronoun is used in dialogue. Therefore, in this case, context information is also necessary for the computer to process. Moreover, in the level of semantic analysis, context information such as a topic is necessary to solve ambiguity of polysemic words and context information in a series of dialogue is necessary to recognize speaker's intention such as request or acceptance.

In region of natural language processing as for written language, a method to use semantics such as DST (Discourse Structure Theory) or Situation Semantics is used and a method for processing context information by means of hierarchy planning, which utterance-intention such as request or acceptance is operator, is also used. In this case, perfect transcription of all utterances or perfect semantic description is necessary.

However, in case of processing of dialogue-sound, sound signal of more than two users is inputted. Therefore, it is impossible to prepare the perfect transcription of all utterances or the perfect semantic description.

Moreover, in dialogue-sound, it is not always that user speaks a sentence whose structure is grammatically perfect. It often happens that user speaks as spoken utterance, interjection or communicative support, and non-grammatical sentence such as rephrase or hesitation. Then, it happens that plural utterances of two speakers are overlapped in time series. The above-mentioned situation is peculiar to the spoken language, being different from written language. The spoken language which is spoken spontaneously is grammatically very irregular. Therefore, it is impossible to apply the technique of natural language of the prior art to the dialogue-sound processing.

In short, the context information is certainly necessary to analyse the dialogue-sound However, processing-technique of the context information of the prior art is the technique of exclusive use for written language. Therefore, the technique is not utilized for processing of dialogue-sound. As a result, it is impossible to analyse context of the dialogue-sound. Additionally, in human-computer dialogue system of the prior art, it is impossible to deal with spontaneous spoken utterances.

Next, as the above-mentioned, the context information is important for sound-processing, language-processing and semantic processing. Especially, in dialogue-sound processing, omission of word (ellipsis), referring of expression or spoken utterance is often included. Therefore, each utterance depends on another and the context information is important to the analysis. In the prior art, exchange structure is used to describe the structure of dialogue. The exchange structure is explained in detail.

utterance 1: What is ~?
utterance 2: That's ~.
utterance 3: That so?

In above example, the utterance 1 is a question is initiation-utterance, the utterance 2 is an answer is response-utterance and the utterance 3 is a confirmation of the answer is feedback-utterance. The exchange structure is composed of the initiation-utterance, the response-utterance and the feedback-utterance (opptional element for the exchange structure), and structure of each utterance of the dialogue is generated by using pattern of the exchange structure. However, in the prior art, technique of the exchange structure includes two problems.

As a first problem, the initiation-utterance, the response-utterance and the feedback-utterance are required as a grammatically complete sentences, but fragmentary spoken utterance whose grammatical structure is not perfect in actual dialogue. Therefore, the technique of the exchange structure is not utilized for processing of actual dialogue.

As a second problem, plural participants of dialogue speak respectively according to each different will. Therefore, it is not always that a utterance of one participant is accepted to other participant. For example, it happens that the utterance of one participant is not accepted and canceled by new utterance of another participant. In short, the exchange-structure of the prior art is not utilized for processing of dialogue-sound.

Next, in the area of technique of information processing, multimedia information processing such as character, sound, image has been developed. In this technique, hyper-text, which is able to extract relational data by using link between various kinds of media, is considered. As for dialogue-sound, in order to extract necessary part of data of the dialogue-sound, it is desired that all data of the dialogue-sound is hierarchically constructed by a unit of semantic groups. In the prior art, as for written language, a method for automatically extracting context information representing the point of argument is developed. In this place, as for the dialogue-sound, this kind of method is not developed. Accordingly, the user constructs hierarchical data of the dialogue-sound by linking between each spoken utterance while he listens to the dialogue-sound. However, construction of the hierarchical data for lots of the dialogue-sound by itself is limited. Therefore, it is impossible for the user's work to find grammatical error in the spoken utterance and set a standard for construction of the hierarchical data.

Next, a technique for summarization of information and for presenting of the summary to effectively extract necessary information from a large amount of information has been developed. In the prior art, as for summarization of the written language, a method for extracting important sentences including predetermined keyword, and summary-generation technique based on context structure representing development of a point of argument are considered. In area of sound-synthesis, a method for controlling phrasing of sound according to grammatical structure and a method for deleting time interval of vowels are only considered. However, as for technique for summarization of the dialogue-sound, technique of playing the sound with fast forward by controlling sound-pitch is only considered. In short, summarization method of the dialogue-sound in easy-listening condition has not been developed yet.

SUMMARY OF THE INVENTION

It is an object of the present invention to provide dialogue-sound processing apparatus and method for generating discourse structure representing the flow of dialogue of at least one participant without transcription of the dialogue.

It is another object of the present invention to provide a dialogue-sound processing apparatus and method for user to speak by natural utterance (speech fragment) to computer as human-computer dialogue system.

According to the present invention, there is provided a dialogue-sound processing apparatus, comprising; sound input means for inputting speech fragments of dialogue-sound in sequence; clue extraction means for extracting a plurality of the clues, each clue comprising a word or prosodic feature representing a flow of a dialogue from the speech fragments; utterance function rule memory means for memorizing a plurality of utterance function rules, each rule defining a relation between one of the clues and an utterance function representing a pragmatic effect for the flow of the dialogue; utterance function extraction means for assigning the utterance function to the clue extracted by said clue extraction means in accordance with the corresponding utterance function rule; and discourse structure generation means for generating a discourse structure representing the flow of the dialogue from fragmental speech in accordance with the assigned utterance function.

Further in accordance with the present invention, there is provided a dialogue-sound processing apparatus, comprising; sound input means for inputting user's sound signal; input analysis means for analysing the sound signal and for outputting input-intention information of the sound signal; problem solution means for solving problem corresponding to the input intention information and for outputting response-intention information as solution result; output generation means for generating response information to the user in accordance with the response-intention information; clue extraction means for extracting a plurality of clues, each clue comprising a word or prosodic feature representing a flow of a dialogue from speech fragments in the sound signal; utterance function rule memory means for memorizing a plurality of utterance function rules, each rule defining a relation between one of the clues and an utterance function representing a pragmatic effect for the flow of the dialogue; utterance function extraction means for assigning the utterance function to the clue extracted by said clue extraction means in accordance with the corresponding utterance function rule; and discourse management means for generating a discourse structure representing the flow of the dialogue between the user's sound signal and the response information in accordance with at least one of the assigned utterance function and the input-intention information, at least one of the response-intention information and the response information, and for controlling at least one of the analysis processing of said input analysis means, the solution processing of the problem solution means and the generation processing of the output generation means in accordance with the discourse structure.

BRIEF DESCRIPTION OF THE DRAWINGS

FIG. 2 is a schematic diagram of content of a sound memory section of the embodiment.

FIG. 3 is a schematic diagram of classification and concrete example of clue.

FIG. 4 is a schematic diagram of content of a clue dictionary of the embodiment.

FIG. 5 is a schematic diagram of concrete example of utterance functions.

FIG. 6 is a schematic diagram of content of an utterance function dictionary of the embodiment.

FIG. 8 is a schematic diagram of an example of dialogue including cancel utterance.

FIG. 11 is a schematic diagram of content of a structure generation rule memory section of the embodiment.

FIG. 12 is a schematic diagram of content of a discourse structure memory section of the embodiment.

FIG. 14 is a schematic diagram of examples of the dialogue-sound which is summarized.

DETAILED DESCRIPTION OF THE PREFERRED EMBODIMENTS

One embodiment of the present invention will be explained.

Figure 1:
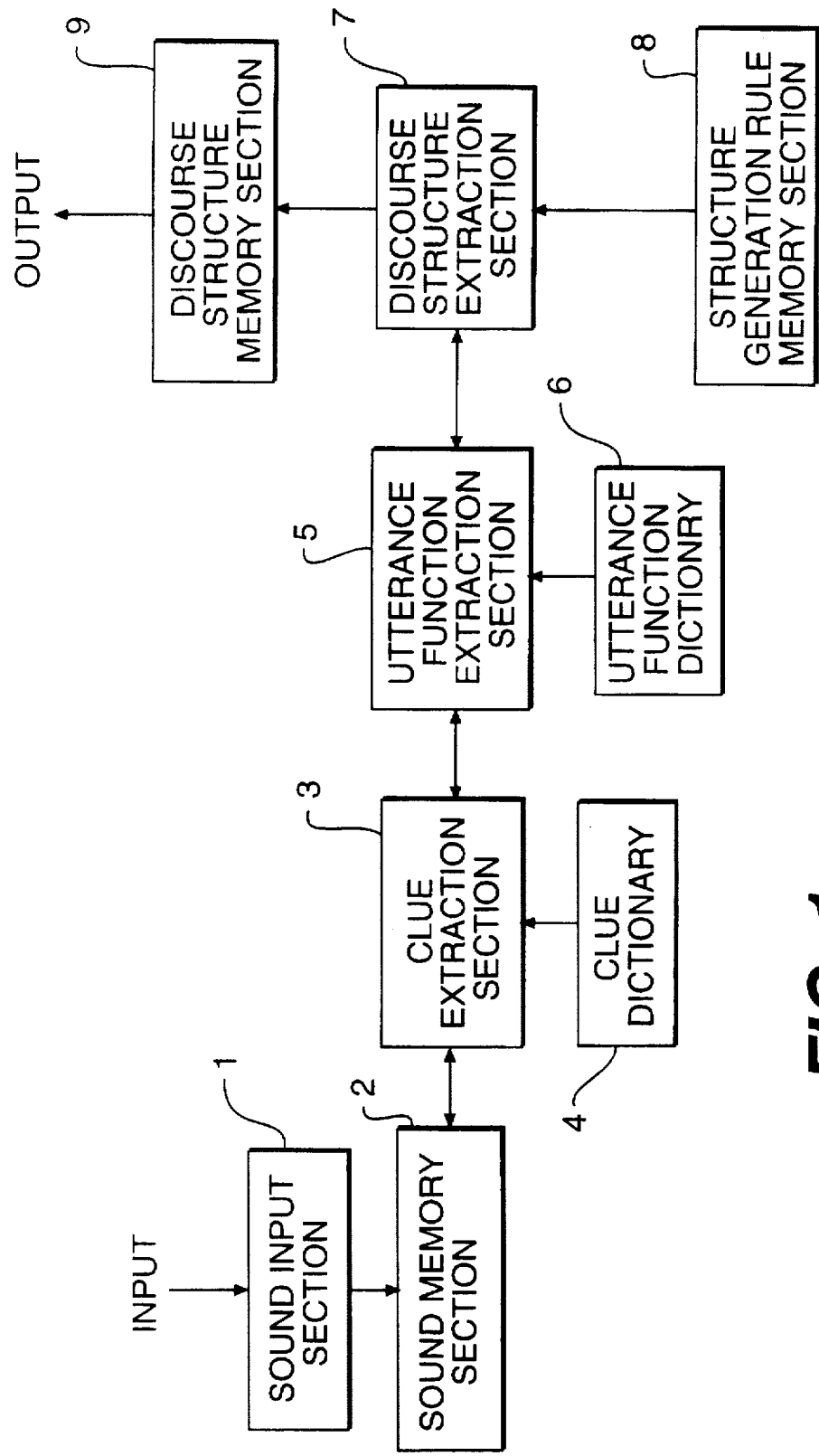
FIG. 1 is a block diagram of the dialogue-sound processing apparatus according to an embodiment of the present invention.

FIG. 1 is a block diagram of a dialogue-sound processing apparatus according to the embodiment. In FIG. 1, a sound input section 1 is comprised of a microphone and an A/D converter. A sound memory section 2 classifies the dialogue-sound by unit of utterance (speech fragment) and stores the dialogue-sound with time information. The speech fragment is fragmentary spoken utterance as input data for this system.

FIG. 2 is a schematic diagram of content of the sound memory section 2. In the sound memory section 2, information of each utterance of dialogue-sound from the sound input section 1 is classified as utterance ID information, speaker sign information, utterance beginning point information, utterance end point information, dialogue sound information, and stored in correspondence to stored address information. In area of the utterance ID information, discrimination sign of each utterance is stored. In area of the speaker sign information, sign of speaker who speaks the utterance is stored. In area of the utterance begining point information and the utterance end point information, beginning time and end time of each utterance is stored. In area of the dialogue sound information, sound information of the utterance is coded by PCM (pulse-code-modulation) method and stored.

A clues extraction section 3 extracts clue from the dialogue sound information by referring to a clue dictionary 4. The clue is a word or prosodic feature representing the flow of dialogue from fragmental speech of participants. In short, the clue is a redundant word or expression without meaning. FIG. 3 is a schematic diagram of classification and concrete example of the clue. As shown in FIG. 3, linguistic clue is communication support, interjection, connection and others, which represent flow of dialogue. Prosodic clue is pose and intonation of end of sentence. As for the luinguistic clue, surface of strings of each utterance is shown in FIG. 3. As for the prosodic clue, the pose is shown as sign "(P)", rise-intonation is shown as sign "(↑)", fall-intonation is shown as sign "(↓)", rise and fall-intonation is shown as sign "(↑↓)" in FIG. 3. FIG. 4 is a schematic diagram of content of the clue dictionary. As shown in FIG. 4, clue ID information and sound-characterictic of clue information (surface of string, sign of rise and fall) are stored. In this way, the clue extraction section 3 retrieves sound-characteristics of the clue included in each utterance by referring the clue dictionary and outputs the clue ID information. In this case, sound recognition processing, i.e., extraction processing of fundamental frequency (F0:intonation) is disclosed in "An Integrated Pitch Tracking Algorithm for Speech Systems", Proceedings ICASSP83, pp. 1352-1355.

An utterance function extraction section 5 refers an utterance function dictionary 6 in accordance with the clue extracted by the clue extraction section 3 and assigns corresponding utterance function to each clue. The utterance function represents pragmatic effect of each clue for the flow of dialogue. FIG. 5 is a schematic diagram of explanation of utterance functions. In FIG. 5, classification of utterance function is a substantial function appealing dialogue-partner and a control function maintaining communication. FIG. 6 is a schematic diagram of content of the utterance function dictionary 6. As shown in FIG. 6, store address information, clue ID information and utterance function information are stored in the utterance function dictionary 6. The clue ID information of the utterance function dictionary in FIG. 6 corresponds to the clue ID information of the clue dictionary 4 in FIG. 4. As shown in FIG. 6, in entry of store address "Q01", clue ID "R1" corresponds to utterance function "PRESENTATION OF TRUTH VALUE". In FIG. 4, clue ID "R1" corresponds to sound characteristics of clue "Yes(↓)". Therefore, if clue "Yes" which intonation of the ending of the word falls is found in the utterance, the utterance function "PRESENTATION OF TRUTH VALUE" is retrieved by the clue ID "R1". In short, the clue "Yes(↓)" is used to present truth value in dialogue. In entries of store address "Q02~Q04", clue ID "R1" is same as that of store address "Q01". Therefore, same clue "Yes(↓)" includes different utterance function exclusively. Contrary to this, in entry of store address "Q05", clue ID "R2" corresponds to sound-characteristics of clue "Yes(↓)" in FIG. 4. In short, surface string of clue ID "R2" is the same as that of clue ID "R1". However, sound-characteristics of clue ID "R2" is different from that of clue ID "R1" because these clue ID "R1""R2" are different. Concretely speaking, in store address "Q07""Q08" of FIG. 6, clue ID "R4""R5" are different. Therefore, sound-characteristics of clue ID "R4" is different from that of clue ID "R5". For example, sound-characteristics "Yes(↓)" of clue ID "R4" is utterance presenting suspicion for utterance of partner. Sound characteristics "Yes (↑)" of clue ID "R5" is utterance presenting failure of communication to partner when the speaker fails to hear utterance of the partner.

A discourse structure extraction section 7 receives the utterance function corresponding to each clue from the utterance function extraction section 5 and generates the discourse structure representing the flow of dialogue by referring to a structure generation rule memory section 8. The structure generation rule memory section 8 previously memorizes structure generation rule. Then, a discourse structure memory section 9 stores the discourse structure. (This processing will be explained afterward).

Figure 7:
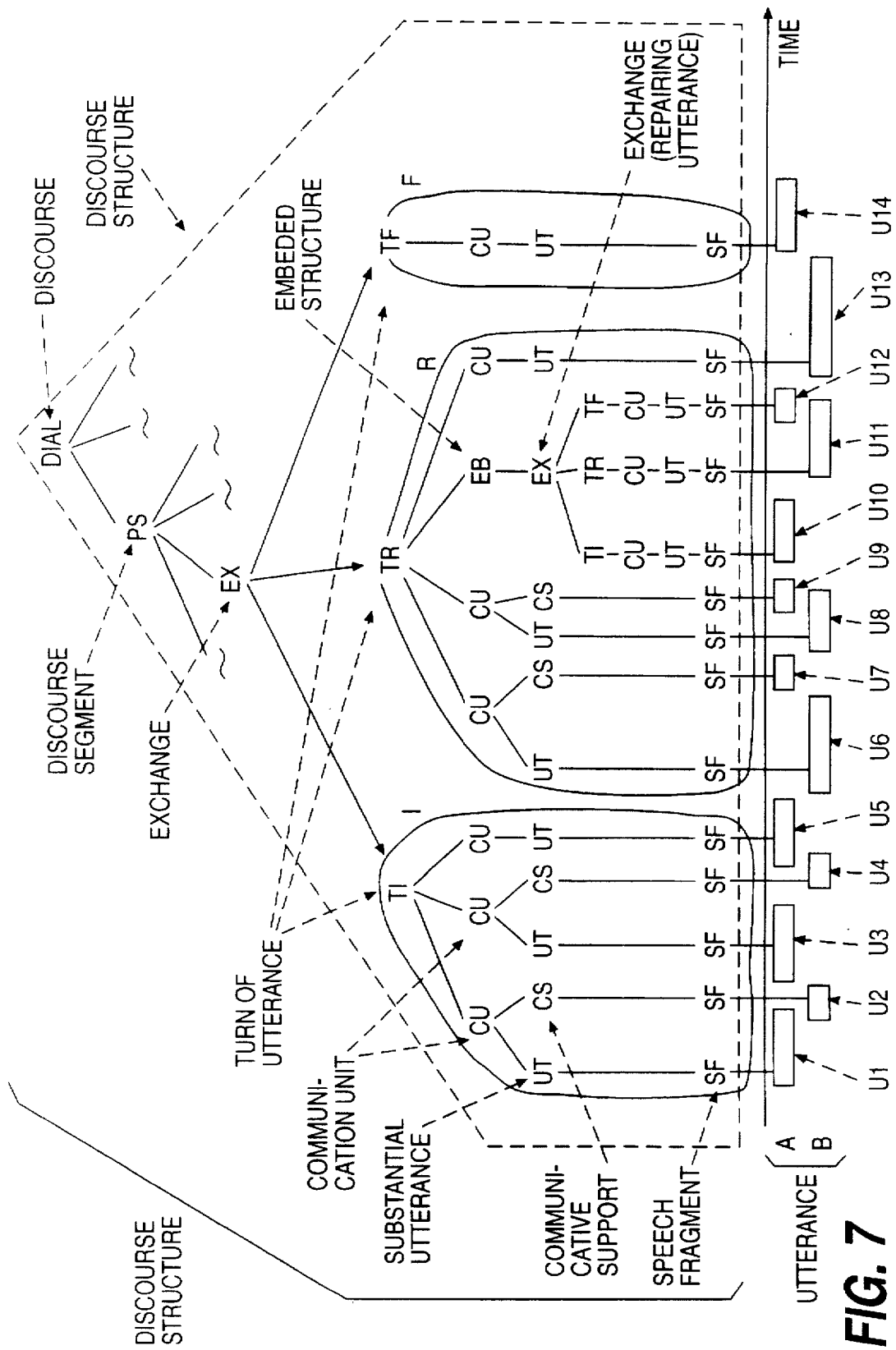
FIG. 7 is a schematic diagram of discourse structure according to the embodiment of the present invention.

FIG. 7 is a schematic diagram of example of discourse structure. In FIG. 7, an area surrounded by a dotted line represents hierarchical tree of the discourse structure. Two participants of the dialogue "A,B" and each utterance "U1~U14" is shown along time axis under the area of the discourse structure. In FIG. 7, sign "SF" represents speech fragment (utterance) of each participant of dialogue. Participant's name, time information and other information (utterance function, clue) with each speech fragment are stored in the discourse structure memory section 9. Sign "UT" represents substantial utterance which the speech fragment has substantial function. Sign "CS" represents communicative support which the speech fragment does not have substantial function. Sign "CU" represents communication unit consisting of substantial utterance of one participants and communicative support for each substantial utterance, which is minimum unit of communication between participants. In this case, the participant who speaks the substantial utterance is called as initiative participant. For example, in FIG. 7, the utterance "U1" is a substantial function "UT". In FIG. 2, the utterance "U1" includes linguistic clue "Hi!" which is request for acquisition of initiative, opening of session and attention. The utterance "U1" also includes luinguistic clue "May I ask you something?" which is presentation of maintenance of initiative. In the same way, the utterance "U2" is a communicative support "CS". In FIG. 2, the utterance "U2" includes linguistic clue "Yes" and prosodic clue (rise-intonation) "(↑)" which is presentation of failure of communication. Moreover, in FIG. 7, node "UT,CS" corresponding to the utterance "U1,U2" is child-node of one communication unit "CU". Therefore, these two utterances "U1,U2" forms communication-information between two participants A,B. In FIG. 7, sign "TI" represents turn of initiation, sign "TR" represents turn of response and sign "TF" represents turn of feedback, each of which is consisted of one or plural communication units of one initiative-participant respectively. The initiative-participant in each communication unit of the turn of utterance is called as the initiative-participant in the turn of utterance. Sign "EX" represents exchange of uttarance which is consisted of turn of initiation, turn of response or turn of feedback. The initiative-participant in turn of initiation of the exchange of utterance is called as the initiative-participant in the exchange of utterance. Sign "DS" represents discourse segment which is consisted of one or plural exchange of utterance which same participant has initiative. Sign "DIAL" represents discourse which includes one or plural discourse segments "DS", which is only one root-node in all discourse.

As the above-mentioned, by setting levels of the speech fragment and the communication unit in the discourse structure, it is possible to process various utterance of plural participants, and by setting levels of the exchange and the discourse segment in the discourse structure, it is possible to clearly represent each area which participant has initiative respectively.

Next, in the discourse structure of this embodiment, embedded structure is used as other construction element. In FIG. 7, sign "EB" represents the embedded structure for embedded discourse to solve ambiguity of failure of communication between plural participants. By setting a level of the embedded structure, it is possible to process the embedded-dialogue of actual dialogue-sound. For example, in FIG. 7, three communication units "CU" including five utterances "U1~U5" form the turn of initiation "TI", three communication units "CU" including eight utterances "U6~U13" and one embedded structure "EB" form the turn of response "TR", one communication unit "CU" including one utterance "U14" forms the turn of feedback "TF". Then, these three turns of utterance "TI,TR,TF" forms the exchange "EX". The exchange "EX" and other parts (it is shown as "~" in FIG. 7) form the discourse segment "DS". The discourse segment "DS" and other parts (it is shown as "~" in FIG. 7) form the dialogue "DIAL". Moreover, three utterances "U10~U12" form the embedded structure "EX", which is a part of the turn of response "TR".

Next, in the discourse structure of this embodiment, cancel structure is used as other construction element. In general, the dialogue is generated by plural participants who respectively speak according to their will. Therefore, it is not always that first participant receives an utterance of second participant, nor passes the initiative of utterance to the second. In short, it often happens that the utterance of the second participant is canceled by the first participant.

FIG. 8 is a schematic diagram of an example of dialogue-sound including cancel structure. In FIG. 8, sign "1" represents time-synchronization between neighboring utterances. For example, utterances V3,V4 start at same time. When "Tommorow" of the utterance V4 finishes, the utterance V3 finishes and the utterance V5 starts. When "meeting in" of the utterance V4 finishes, the utterance V5 finishes. Sign "( . . . )" represents interruption of utterance.

Figure 9:
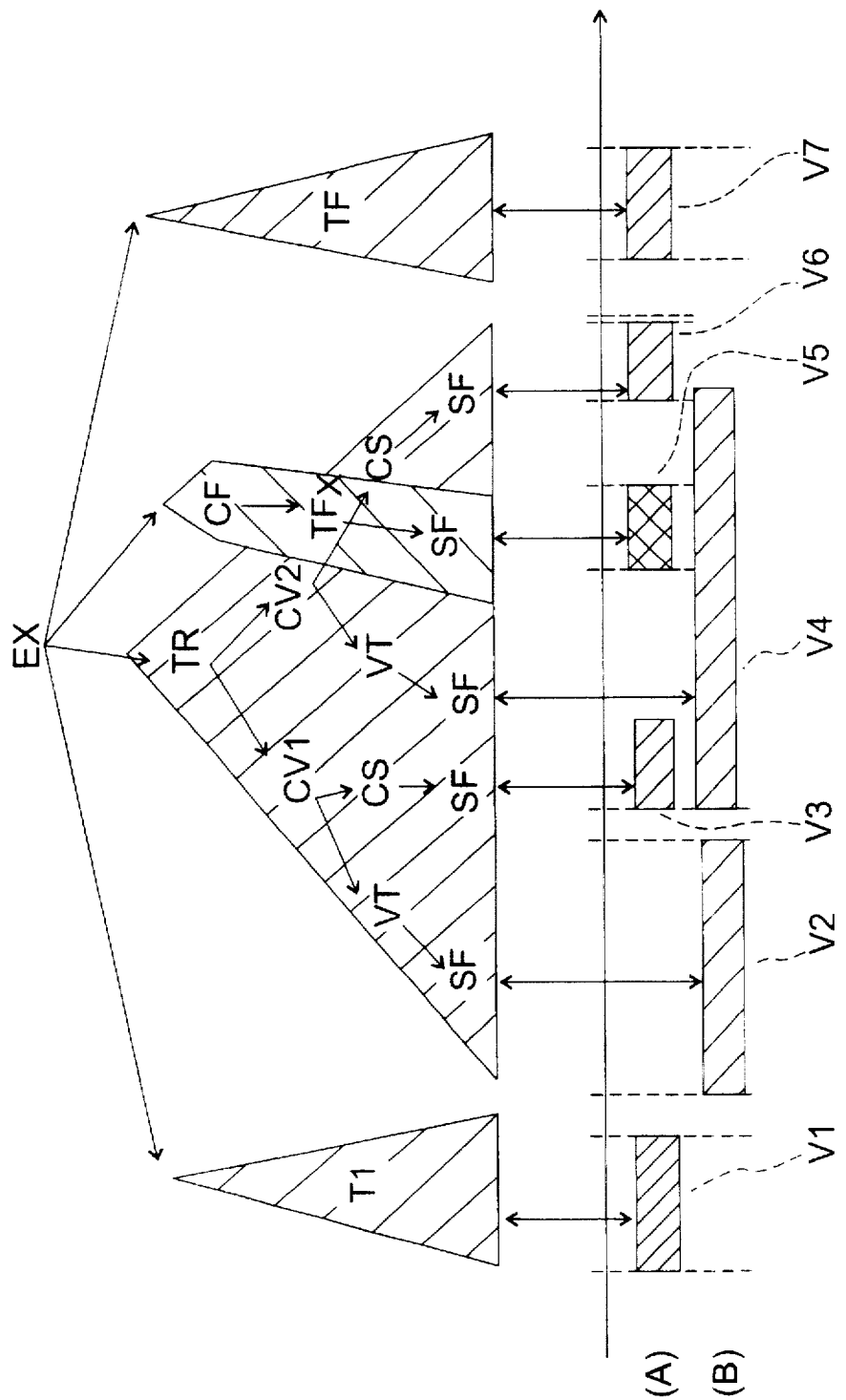
FIG. 9 is a schematic diagram of an example of discourse structure including cancel structure.

FIG. 9 is a schematic diagram of discourse structure of the dialogue shown in FIG. 8. First, in FIG. 9, turn of initiation (TI) is presented by the utterance V1 "When are you going?" of speaker A. Next, speaker B talks the utterance V2 "Let me see. You see this meeting will be held in Tokyo." as response. Continuously, the speaker A talks the utterance V3 "Uh-huh." as communicative support and the speaker B talks the utterance V4 "Tommorow" at same time. When the speaker B finishes talking "Tommorow", the speaker A starts the utterance V5. This situation represents that the speaker A decides the utterance V4 of the speaker B finishes at this time and the speaker A begins to talk the utterance V5 as turn of feedback. However, actually, the utterance V4 of the speaker B does not finish at this time, and the utterance V4 continues as "I've got another meeting in Osaka". Therefore, the speaker A interrupts the utterance V5. As a result, the utterance V5 of the speaker A is canceled, and this discourse structure is represented as turn of canceled feedback (CF) in FIG. 9. Then, the speaker B talks the utterance (V4) "So I'm leaving Friday." and the speaker A talks the utterance V6 "Oh" as communicative support. Continuously, the speaker A talks the utterance V7 "You mean you're leaving Friday." as turn of feedback to the speaker B. In short, even if the utterance V5 as feedback from the speaker A to the speaker B is canceled by the utterance V4 which the speaker B continues to talk, the canceled structure of the utterance V5 is included in exchange (EX) of the discourse structure.

The extraction process of the discourse structure uses extended "segment the prior art for generating syntax structure of sentence according to semantic fragment. The original "segment grammar" is disclosed in "(Koenraad DeSmedt, Segment Grammar: a Formalism for Incremental Sentence Generation, In C. L. Paris (Eds.), Natural Language Generation in Artificial Intelligence and Computational Linguistics, Kluwer Academic Pob., pp. 329-349, 1991.). (Koenraad DeSmedt. IPF: An Incremental Parallel Formulator, In R. Dare (Eds.), Current Research in Natural Language Generation, Kluwer Academic Pub., pp. 167-192, 1990)".

Figure 10A:
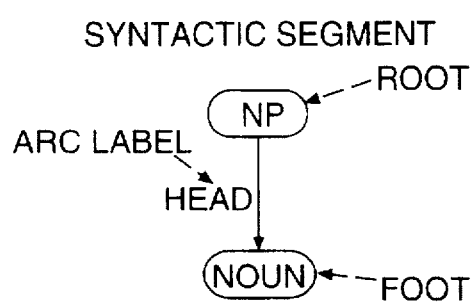
FIGS. 10(a)–10(d) are schematic diagrams of a fundamental element of segment grammar and three cases of processing of segments.
Figure 10B:
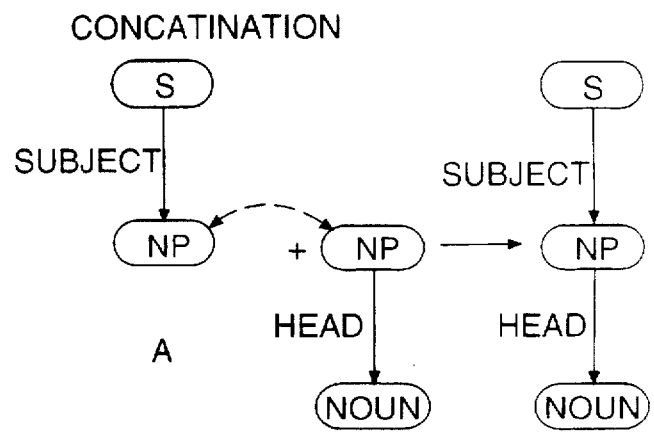
Figure 10C:
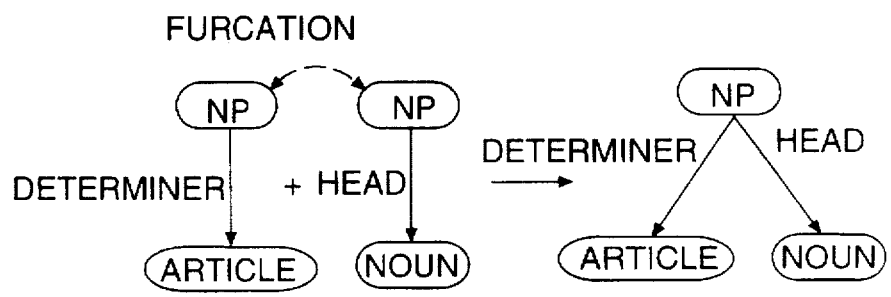
Figure 10D:
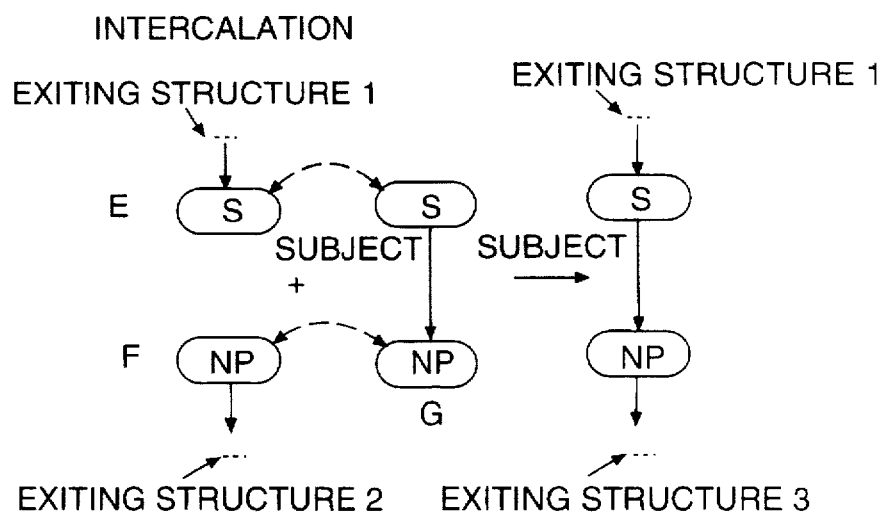

FIGS. 10(a)–10(d) schematic diagrams of a fundamental element of segment grammar and three cases of processing the segments. FIG. 10(a) shows "Syntactic Segment" consisting of a root and a foot, which are basic elements of segment grammar. FIG. 10(b) shows "Concatination" operation which a foot of segment A is combined with a root of segment B to generate one segment if condition between the foot of segment A and the root of segment B is satisfied, for example, category of the foot of segment A coincides with category of the root of segment B. FIG. 10(c) shows "Furcation" operation which a root of segment C is combined with a root of segment D to generate one segment if condition between the root of segment C and the root of segment D is satisfied. FIG. 10(d) shows "Intercalation" operation in which a foot of segment E is combined with a root of segment G and a root of segment F is combined with a foot of segment G to generate one segment if condition between the foot of segment E and the root of segment G is satisfied and condition between the root of segment F and the foot of segment G is satisfied. By using the above three operations, the discourse structure is generated from speech fragments (which contains some clues and some utterance functions).

In the embodiment of the present invention, the structure generation rule memory section 8 previously stores rules for generating the discourse structure according to the segment grammar. FIG. 11 is a schematic diagram of content of structure generation rule memory section 8. As shown in FIG. 11, the structure generation rule is consisted of rule ID, root category, root condition, foot category, foot condition, occurrence condition and store address. The rule ID is ID number of corresponding structure generation rule. The root category and the foot category are respective category name of node in the discourse structure. For example, at entry of store address S21, rule ID is "T3" representing that root category of the segment is "CU" (communication unit) and foot category of the segment is "UT" (substantial utterance). The root condition and the foot condition are conditions to be satisfied by the root and the foot respectively. In FIG. 11, sign "=" represents coincidence of value, sign "≠" represents uncoincidence of value, sign "t" "f" represent truth and false respectively, sign "φ" represents null set, sign "–" represents no condition, and sign "X" represents a variable. For example, in FIG. 11, the foot conditions of store address S11,S12 represent "substantial function≠φ", "substantial function=φ" respectively. Therefore, speech fragment of substantial utterance includes at least substantial function and speech fragment having no substantial function is communicative support (CS). At entry of store address S31, the root condition represents "initiative=X" and the foot condition represents "initiative=X". Therefore, as for segment generated by rule S31, it is necessary that initiative speaker of the root coincides with initiative speeker of the foot. In area of the occurrence condition, condition of segment generated by corresponding rule is described. Sign "1" represents one time of occurrence, sign "1+" represents one or plural times of occurrence, sign "0+" represents zero or one or plural times of occurrence, and sign "( )" represents condition being able to select without preference. For example, at store address S44 in FIG. 11, the occurrence condition represents "1,(0)". Therefore, one turn of feedback nodes (TF) is able to occur as a foot of a exchange (EX) node, the occurrence is preferable and the one turn of feedback may be able not to occur. Then, at store address S43, the occurrence condition represents "(0+)". Therefore, turn of canceled feedback (CF) is able to occur in exchange (EX) at arbitrary times, the occurrence is not preferable and the discourse structure which the turn of canceled feedback (CF) is not included in the exchange (EX) is more preferable.

FIG. 12 is a schematic diagram of content of the discourse structure memory section 9. The discourse structure includes node ID, constraint list, parent node ID and store address. The node ID represents ID of node in the discourse structure. The constraint list represents constraint condition of corresponding node. The parent node ID represents ID of parent node of corresponding node in the discourse structure. For example, at store address W21 in FIG. 12, constraint list of speech fragment SF2 is "presentation of attention, speaker= B". Therefore, it is decided that the speaker B talks the speech fragment SF2 by intention of presentation of attention to the speaker A. The parent node ID of store address W21 is "CS2". Therefore it is decided that parent node of the node SF2 is "CS2".

Next, processing for extracting the discourse structure from the dialogue-sound will be explained in detail. The processing is executed by following processing method A.

Processing Method A (A1) When sound signal of dialogue is supplied through the dialogue-sound input section 1, the information of the sound signal is stored at store address (PX) in the dialogue-sound memory section 2 as shown in FIG. 2.

(A2) New store address (WX) corresponding to speech fragment is generated in the discourse structure memory section 9, new node ID of the speech fragment is assigned in area of node ID and related information such as speaker-name is written in area of the constraint list of the store address (WX). In this case, sign "?" representing uncertainty is written in area of the parent node ID.

(A3) By referring to the clue dictionary 4, luinguistic clue and prosodic clue are extracted from the dialogue-sound information corresponding to the store address PX in the dialogue-sound memory section 2.

(A4) By referring to the utterance function dictionary 6, the utterance functions corresponding to the luinguistic clue and the prosodic clue are extracted and additionally written in an area of the constraint list corresponding to the store address (WX) in the discourse structure memory section 9.

(A5) As for arbitrary two store addresses (Wi,Wj) in the discourse structure memory section 9, processing of unification method B is executed.

(A6) As for arbitrary store address (Wi), processing of upward expanding C is executed.

Unification Method B (B1) If the parent node ID of node (Ni) corresponding to the store address (Wi) is not "?", the processing of the unification method B finishes.

(B2) If the node (Nj) corresponding to the store address (Wj) is included in tree structure whose root is the node (Ni), the processing of the unification method B finishes.

(B3) If category of the node (Ni) is different from category of the node (Nj), the processing of the unification method B finishes.

(B4) If constraint list of the node (Ni) is inconsistent with constraint list of the node (Nj), the processing of the unification method B finishes.

(B5) The occurrence condition of store address (Si) which is referred to generate the node (Ni) is examined. If the occurrence condition is not satisfied by unifying the node (Ni) and the node (Nj), the processing of the unification method B finishes.

(B6) The occurrence condition of store address (Sj) which is referred to generate the node (Nj) is examined. If the occurrence condition is not satisfied by unifying the node (Ni) and the node (Nj), the processing of the unification method B finishes.

(B7) The content of the constraint list corresponding to the store address (Wj) is additionally written in area of constraint list corresponding to the store address (Wi) without overlap.

(B8) All ID of the node (Nj) in the discourse structure memory section 9 is rewritten as ID of the node (Ni).

(B9) The area of the store address (Wj) is deleted.

(B10) END

Upward Expanding Method C (C1) If the parent node ID of store address (Wi) is not "?", processing of upward expanding method C finishes.

(C2) The store address (Sj) whose foot category and foot condition coincides with node ID and constraint list of the store address (Wi) is searched from the structure generation rule memory section 8. If the store address (Sj) is extracted, new node (Nk) of root category of the store address (Sj) is additionally written in the discourse structure memory section 9, and ID of the node (Nk) is written in area of parent node ID of the store address (Wi).

(C3) END

Next, concrete example of processing of the embodiment will be explained in detail.

① When an utterance (U1) "Hi!, May I ask you something?" is supplied through the sound input section 1, store address (P11) is written in the sound memory section 2 as shown in FIG. 2 and store address (W11) is written in the discourse structure memory section 9. At this time, constraint list and parent node ID of the store address (W11) are not written.

② By referring to the clue dictionary 4, linguistic clue "Hi!" (clue ID=R6) and "May I ask you something?" (clue ID=R7) are extracted from the dialogue-sound information of the utterance (U1).

③ By referring to the utterance function dictionary 6, the utterance functions of store address (Q11) (Q21) are extracted by the clue ID (R6) (R7) respectively. These utterance functions (Q11) (Q21) are written in area of constraint list of the store address (W11). Additionally, if keyword of noun (speaker name) is extracted from the utterance (U1) the keyword is also written in the area of constraint list.

④ The same processing is executed for utterance (U2~U14). Then, new store addresses (P12~P24) are written in the sound memory section 2 and new store addresses (W11,W51,W81,...) are written in the discourse structure memory section 9.

⑤ As for area of the new store address in the discourse structure memory section 9, processing of the function method B and the upward expanding method C are executed to generated the discourse structure.

⑥ As for the store address (W11) (speech fragment SF1) in the discourse structure memory section 9 shown in FIG. 12, by using the upward expanding method C of the store address (S11) shown in FIG. 11, new store address (W12) (node ID=UT1) as the parent node of node (SF1) is generated in the discourse structure memory section 9.

⑦ In same way, from store address (W12) (node ID=UT1), new store address (W41) (node ID=CU1) as the parent node of node (UT1) is generated.

⑧ In same way, from store address (W21) (node ID=SF2), new store address (W22) (node ID=CS2) is generated. Then, new store address (W42) (node ID=CU2) is generated. In this case, the store address (W41) and the store address (W42) are unified according to the unification method B.

⑨ By above-mentioned processing, as shown in FIG. 7, partial tree of discourse structure which includes two speech fragments (SF) corresponding to two utterances (U1,U2) as foot, one substantial utterance (UT) and one communicative support (CS) as intermediate node, one communication unit as root, are generated.

Figure 13A:
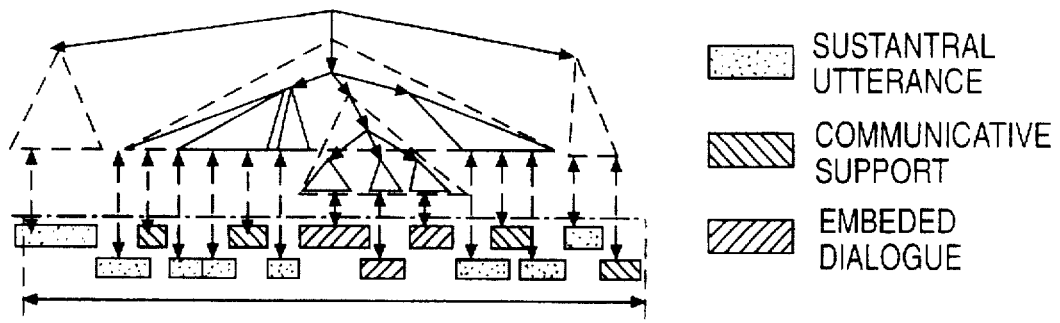
FIGS. 13(a)–13(d) are schematic diagrams of examples of discourse structure which the dialogue-sound is summarized.
Figure 13B:
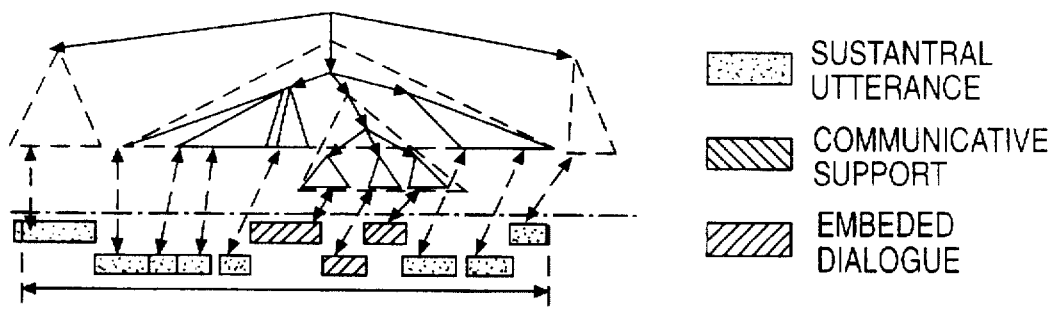
Figure 13C:
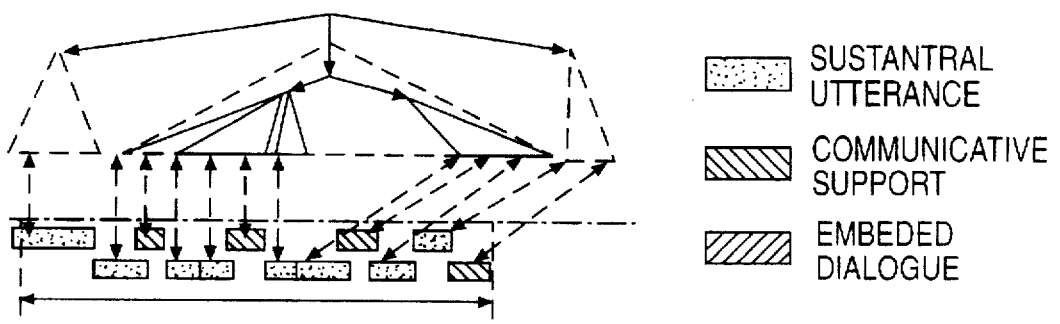
Figure 13D:
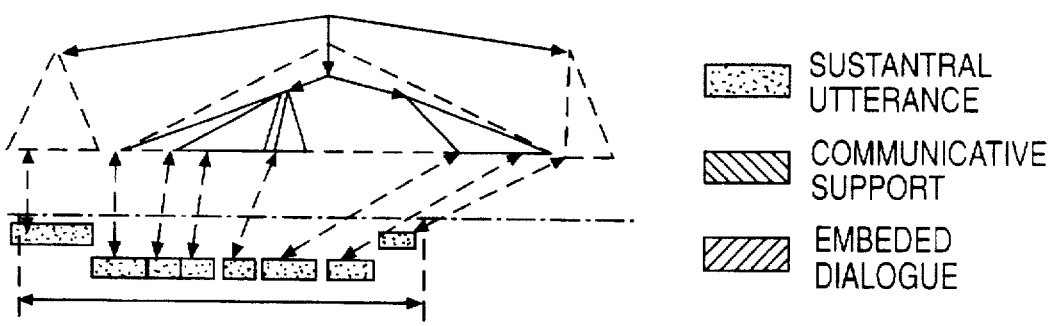

Next, second embodiment of the present invention for summarization of the discourse structure will be explained in detail. FIGS. 13(c)–13(d) are schematic diagrams of example of the discourse structure which is summarized. FIG. 13(a) is original discourse structure which is generated by the dialogue-sound processing apparatus of the first embodiment. FIG. 13(b) is summarized discourse structure which speech fragments of communicative support (CS) are deleted. FIG. 13(C) is summarized discourse structure which speech fragments of embeded structure (EB) and speech fragment of clue to give chance of embedded-dialogue are deleted. FIG. 13(d) is summarized discourse structure which speech fragments of communicative support (CS) and speech fragments of embedded structure (EB) are deleted. FIG. 14 is a schematic diagram of example of dialogue-sound corresponding to the discourse structure shown in FIG. 13.

① FIG. 14(a) is all transcription corresponding to the discourse structure in FIG. 13(a).

② FIG. 14(b) is summarized transcription which speech fragments (U2,U4,U7,U9) of communication support (CS) are deleted from the all transcription by referring to the discourse structure.

③ FIG. 14(c) is summarized transcription which speech fragments (U10,U11,U12) of embedded structure (EB) and a speech fragment (U9) of clue to give chance of embedded-dialogue are deleted from the all transcription by referring to the discourse structure.

④ FIG. 14(d) is summarized transcription which speech fragments (U2,U4,U7,U9) of communication support (CS) and speech fragments (U10,U11,U12) of embedded structure are deleted from the all transcription by referring to the discourse structure.

Next, third embodiment of the present invention of human-computer dialogue system will be explained in detail. In the first and second embodiment, the discourse-structure is extracted from the dialogue between a plurality of humans. However, in the third embodiment, the discourse-structure is extracted from the dialogue between human and computer.

Figure 15:
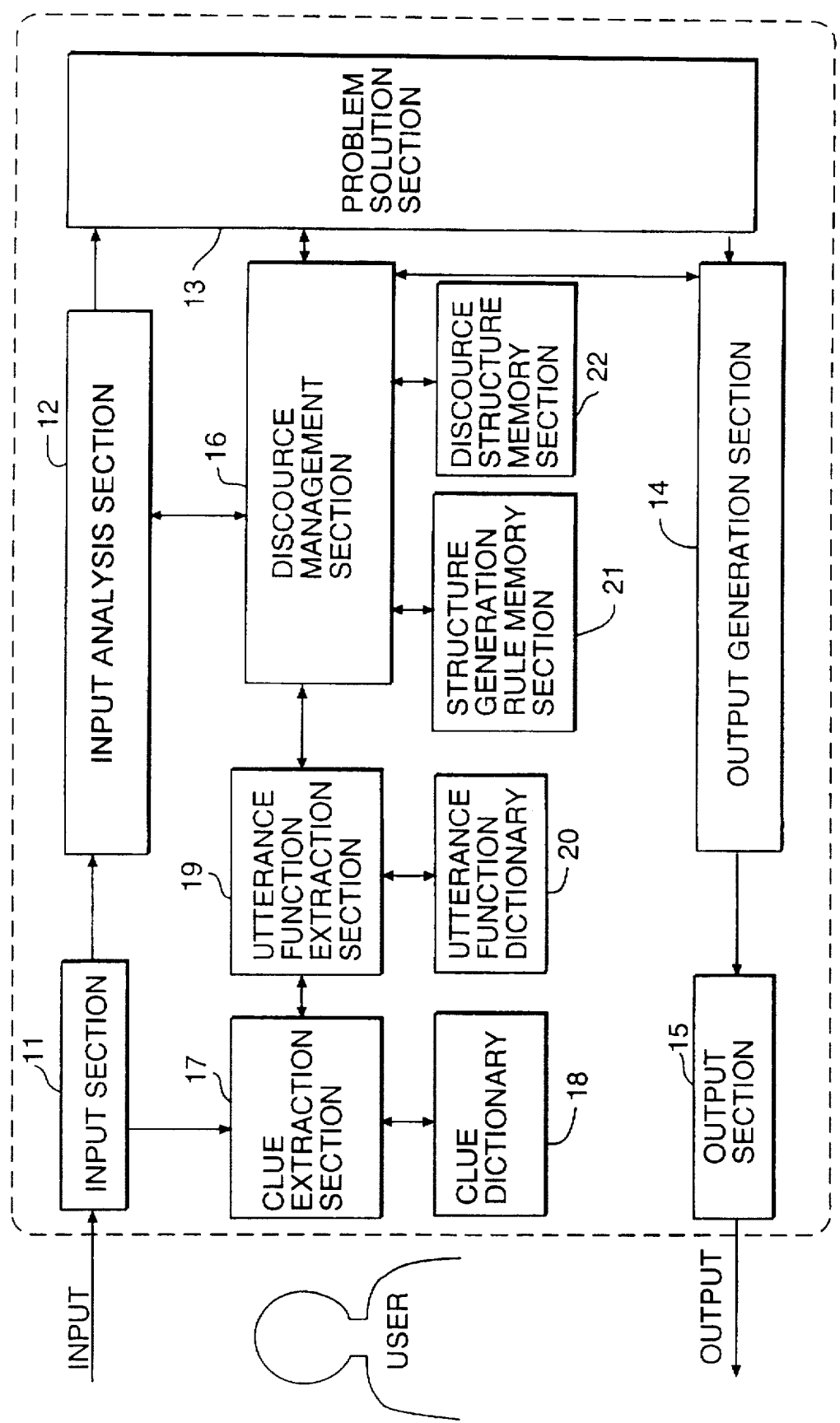
FIG. 15 is a block diagram of the dialogue-sound processing apparatus as human-computer dialogue system according to another embodiment of the present invention.

FIG. 15 is a block diagram of the third embodiment as the human-computer dialogue system to use the discourse structure. In FIG. 15, the human-computer dialogue system is comprised of input section 11, input analysis section 12, problem solution section 13, output generation section 14, output section 15, discourse management section 16 (these above-mentioned sections are basic of the human-computer dialogue system), clue extraction section 17, clue dictionary 18, utterance function extraction section 19, utterance function dictionary 20, structure generation rule memory section 21 and discourse structure memory section 22. In FIG. 15, sound signal of user is supplied through the input section 11 and sent to the input analysis section 12. The input analysis section 12 analyses the sound signal, i.e., sound recognition, language analysis, semantic analysis, and extracts input-intention information. The problem solution section 13 executes problem solution processing for the input-intention information and generates response-intention information. For example, if the input-intention information is a request for some kinds of information, information retrieving processing is executed. If the input--intention information is a request for solving problem by inference or calculation, such as scheduling or road-guidance, the inference or calculation processing is executed. The output generation section 14 executes natural language generation processing or speech synthesis processing for the output-intention information and generates response information to present the user. The output section 15 outputs the response information as sound output or character display. The discourse management section 16 refers to the input-intention information, the output-intention information, the output information and generates information for controlling flow of the dialogue, change of topic by using pair of utterance, plan structure of utterance, state transition diagram of the flow of dialogue. Then, the discourse management section 16 controls all sections of the system according to the generated information.

As for the above-mentioned system, following sections which are same as the first embodiment are added. The clue extraction section 17 receives each utterance of the sound signal. The clue dictionary 18 previously stores the clue which is a word representing flow of dialogue. The clue extraction section 17 extracts the clue from the utterance by referring to the clue dictionary 18. The utterance function dictionary 20 previously stores correspondence relation between the clue and the utterance function representing effect for the flow of dialogue. The utterance function extraction section 19 assigns the utterance function to each clue extracted by the clue extraction section 17 by referring to the utterance function dictionary 20. The discourse management section 16 receives the utterance function corresponding to the clue and the response-intention information. Then, the discourse management section 16 generates the discourse structure which user's utterance and computer's utterance are each speech fragment by referring to the structure generation rule memory section 21. The discourse structure memory section 22 stores the discourse structure generated by the discourse management section 16.

When the input analysis section 12 analyses the sound signal of the user, the problem solution section 13 generates the response-intention information and the output generation section 14 generates the response information, the above-sections refers to the discourse structure representing the flow of dialogue between the user and the computer at that time. Therefore, the above-sections 12,13,14 use context information of the dialogue-sound, i.e., understanding of speech fragment and interruption fragment from the user, activation of embedded utterance from the computer to the user as interruption. As a result, it is able for the human-computer dialogue system to process various kinds of utterance freely.

In the above embodiment, the clue extraction section 17 processes the sound signal for extracting clue. However, the input analysis section 12 may extract utterance-intention information from the sound signal and the discourse management section 16 may generate the discourse structure by using the utterance-intonation information.

In the above embodiment, the human-computer dialogue system processes sound only. However, it is able to gain the same effect in multi-model dialogue system which processes face-image and gesture of the user.

Moreover, even if the human-computer dialogue system consists of sections which are not separated respectively, it is able to construct the system to refer to the dialogue structure in same way of the above embodiment.

In the first embodiment, constraint condition of number of child node belonging to the parent node in the dialogue structure is defined as the occurrence condition. However, the constraint condition may be defined as constraint of linear order between the child nodes or constraint of co-occurrence condition.

In the first embodiment, the dialogue-structure is generated from the dialogue-sound only. However, processing of generating the discourse-structure may be applied to dialogue-record, such as dynamic image. For example, as meeting-record, face image of participants and presentation data are additionally stored with sound-information of each utterance of the participants. In this case, after the discourse structure is extracted from the sound information, the image and the presentation data are synchronously stored with corresponding utterance in accordance with the discourse structure. In this case, because multi-media data are hierarchically constructed, it is able to retrieve these data by unit of semantic group and automatically extract these data as hyper-text.

In the first embodiment, the dialogue-sound is summarized by deleting the utterance of communication support, and so on. However, by playing the utterance of communication support as fast-forward, which is prior art of controlling pitch in speech systhesis, the dialogue-sound is summalized without deleting the content.

What is claimed is:

1. Dialogue-sound processing apparatus, comprising:
    sound input means for inputting speech fragments of dialogue-sound in sequence;
    clue extraction means for extracting a plurality of clues, each clue comprising a word or prosodic feature representing a flow of a dialogue from the speech fragments;
    utterance function rule memory means for memorizing a plurality of utterance function rules, each rule defining a relation between one of the clues and an utterance function representing a pragmatic effect for the flow of the dialogue;
    utterance function extraction means for assigning the utterance function to the clue extracted by said clue extraction means in accordance with the corresponding utterance function rule; and
    discourse structure generation means for generating a discourse structure representing the flow of the dialogue of the speech fragments in accordance with the assigned utterance function.

2. Dialogue-sound processing apparatus according to claim 1,
    wherein said discourse-structure generation means assigns constraint information to each speech fragment in accordance with the utterance function corresponding to the clue, and generates the discourse structure of a hierarchical tree by unification process or upward expanding process of each speech fragment in accordance with the constraint information.

3. Dialogue-sound processing apparatus according to claim 1,
    wherein said discourse-structure of a hierarchical tree includes speech fragments located in order of time series along the flow of dialogue;
    substantial utterance which is the speech fragment having substantial function corresponding to question, request, or acceptance of initiative-speaker;
    the speech fragment including a communicative support having no substantial function;
    the communication unit including one or more substantial utterances of one initiative-speaker and communicative support corresponding to the substantial utterance, which is a minimum unit of information between speakers of the dialogue.

4. Dialogue-sound processing apparatus according to claim 3,
    wherein said discourse-structure of the hierarchical tree includes
        a turn of initiation which is one or more communication units of one initiative-speaker;
        a turn of response which is one or more communication units corresponding to the turn of initiation;
        a turn of feedback which is one or more communication units corresponding to the turn of response; and
        an exchange including at least the turn of initiation and the turn of response, which the one initiative-speaker has initiative of the exchange.

5. Dialogue-sound processing apparatus according to claim 4, wherein said discourse-structure of the hierarchical tree includes
    discourse segments each of which is one or more exchanges of one initiative-speakers and one discourse which is one or more discourse segments.

6. Dialogue-sound processing apparatus according to claim 4, wherein said exchange includes at least the turn of initiation, the turn of response and an embedded level which is an embedded dialogue for correction of premise error or communicative support for resolving defect of dialogue-communication.

7. Dialogue-sound processing apparatus according to claim 4, wherein said exchange includes at least the turn of initiation, the turn of response, and a canceled level which is a rejection expression of transfer of initiative for utterance of opposite-speaker.

8. Dialogue-sound processing apparatus according to claim 6, wherein said discourse-structure generation means deletes or summarizes at least one of the speech fragment of the communication support and the speech fragment of the embedded level to simplify the discourse-structure.

9. Dialogue-sound processing method, comprising the steps of:
    inputting speech fragments of the dialogue-sound in sequence;
    extracting a plurality of clues,, each clue comprising a word or prosodic feature representing a flow of a dialogue from the speech fragment;
    memorizing a plurality of utterance function rules, each rule defining a relation between one of the clues and an utterance function representing a pragmatic effect for the flow of the dialogue;

assigning the utterance function to the clue extracted at the extracting step in accordance with the corresponding utterance function rule; and generating a discourse structure representing the flow of the dialogue of the speech fragments in accordance with the assigned utterance function.

10. Dialogue-sound processing apparatus, comprising:

sound input means for inputting user's sound signal;

input analysis means for analysing the sound signal and for outputting input-intention information of the sound signal;

problem solution means for solving problem corresponding to the input-intention information and for outputting response-intention information as solution result;

output generation means for generating response information to the user in accordance with the response-intention information;

clue extraction means for extracting a plurality of clues, each clue comprising a word or prosodic feature representing a flow of a dialogue from speech fregments in the sound signal;

utterance function rule memory means for memorizing a plurality of utterance function rules, each rule defining a relation between one of the clues and an utterance function representing a pragmatic effect for the flow of the dialogue;

utterance function extraction means for assigning the utterance function to the clue extracted by said clue extraction means in accordance with the corresponding utterance function rule; and discourse management means for generating a discourse structure representing the flow of the dialogue between the user's sound signal and the response information in accordance with at least one of the assigned utterance function and the input-intention information, at least one of the response-intention information and the response information, and for controlling at least one of the analysis processing of said input analysis means, the solution processing of the problem solution means and the generation processing of the output generation means in accordance with the discourse structure.

11. Dialogue-sound processing method, comprising the steps of:

inputting user's sound signal;

analysing the sound signal to output input-intention information of the sound-signal;

solving problem corresponding to the input-intention information to output response-intention information as solution result;

generating response information to the user in accordance with the response-intention information;

extracting a plurality of clues, each clue comprising a word or prosodic feature representing a flow of a dialogue from speech fragment in the sound signal;

memorizing a plurality of utterance function rules, each rule defining a relation between one of the clues and an utterance function representing a pragmatic effect for the flow of the dialogue;

assigning the utterance function to the clue extracted at the extracting step in accordance with the corresponding utterance function rule;

generating a discourse structure representing the flow of the dialogue between the user's sound signal and the response information in accordance with at least one of the assigned utterance function and the input-intention information, at least one of the response-intention information and the response information; and controlling at least one of the analysis processing at the analysing step, the solution processing at the solving step and the response information-generation processing at the response information-generating step in accordance with the discourse structure.

* * * * *